Feb. 18, 1930.                    W. C. GIBSON                    1,747,359
                    SHUT-OFF VALVE FOR ICELESS REFRIGERATORS
                              Filed Oct. 5, 1928

Inventor:
William C. Gibson

Feb. 18, 1930.  W. C. GIBSON  1,747,359
SHUT-OFF VALVE FOR ICELESS REFRIGERATORS
Filed Oct. 5, 1928

Inventor:
William C. Gibson

Patented Feb. 18, 1930

1,747,359

UNITED STATES PATENT OFFICE

WILLIAM C. GIBSON, OF CHICAGO, ILLINOIS

SHUT-OFF VALVE FOR ICELESS REFRIGERATORS

Application filed October 5, 1928. Serial No. 310,587.

This invention relates to valves primarily intended for use on units and coils for iceless refrigerator systems, but also adapted for other uses.

The object of the invention is to provide novel means for preventing leakage of fluid about the valve adjusting means.

Another object of the invention is to provide novel means for sealing the valve adjusting devices so that fluid controlled by the valve will be prevented from escaping about the adjusting means.

Figure 1:
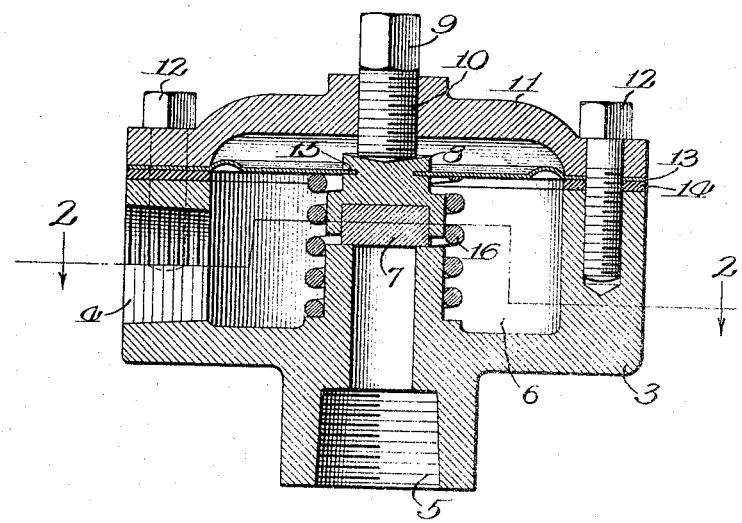
Figure 2:
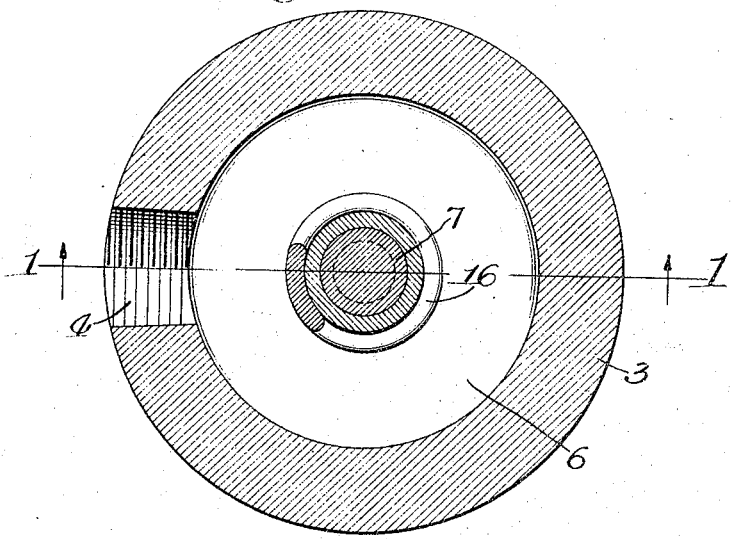
Figure 1:
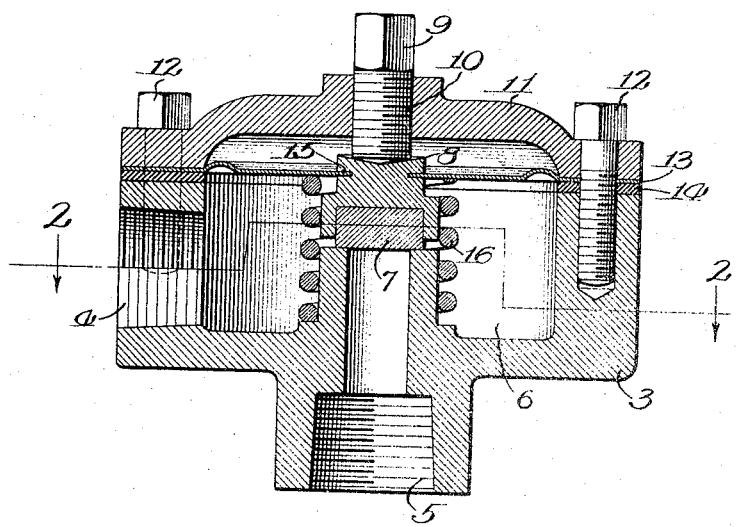
Figure 2:
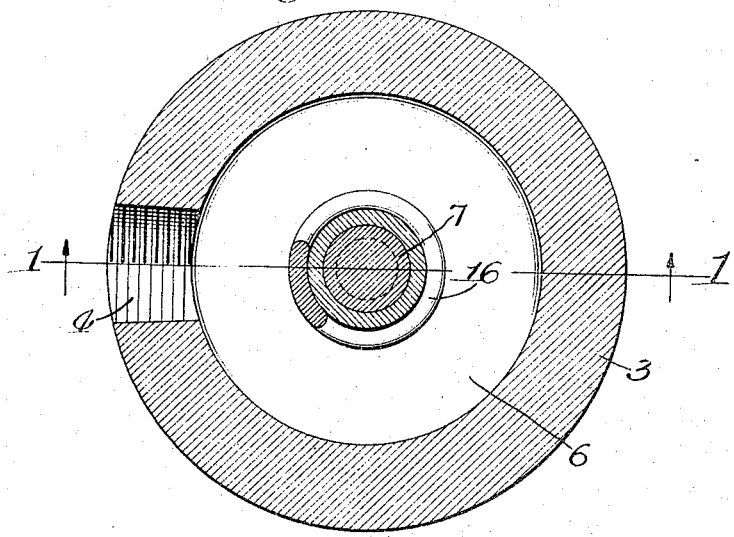

I have illustrated the invention in a shut-off valve for use in an iceless refrigerator system and, referring thereto, Fig. 1 is a sectional elevation on the line 1—1 of Fig. 2; and Fig. 2 is a sectional view on the line 2—2 of Fig. 1.

In the drawings, 3 is a valve body of any suitable size or shape having an inlet 4, which may be an outlet, and an outlet 5, which may be an inlet, both communicating with the valve chamber 6. A valve disk 7 is arranged to seat at the inner end of the opening 5 for controlling the passage of fluid through the valve chamber and this valve disk is provided with a steam comprising the socket member 8 which carries the valve disk 7, and the adjusting member 9 which threadedly engages the opening 10 in a cap 11 which is secured to the body by screws 12. A flexible diaphragm 13 and a gasket 14 are secured between the cap and the body and the diaphragm has a central opening and the edge thereof is seated in a peripheral groove 15 in the rigid stem member 8. A coil spring 16 operates the valve disk 7 and, in the form shown, this spring is arranged between the valve body and the diaphragm.

In Fig. 1, the adjusting stem member 9 is screwed up tight to seat the valve disk and close the opening 5, tensioning the spring 16. When the adjusting stem member is reversely rotated the spring 16 will unseat the valve disk to permit fluid to pass through the valve chamber. The diaphragm constitutes a flexible seal for preventing the fluid controlled by the valve disk from passing to the adjusting means side of the diaphragm and leaking through the opening 10, but at the same time permitting free adjustment of the valve disk as required. The valve disk may be separate from the stem, as shown, or it may be an integral part of the stem member 8, as will be readily understood by those skilled in the art.

The invention provides a valve of simple construction for preventing the leakage of the fluid controlled by the valve disk at the adjusting means which passes through a wall of the valve and is exposed at the outside thereof for manipulation. The adjusting stem member 9 threadedly engages the opening 10 and because this engagement must enable free movement of the member it is liable to permit leakage of fluid controlled by the valve disk unless some means are provided to prevent this leakage, and the diaphragm being secured fluid tight between the cap and the body and in the stem member 8 forms an efficient seal between the valve disk side and the adjusting means side of the diaphragm and prevents fluid controlled by the valve disk from leaking about the adjusting means.

While I have shown and described the invention as used for a shut-off valve for iceless refrigerator systems, it may be used for valves for other purposes and changes in the form, construction and arrangement of parts may be made to adapt it for different purposes, as required, within the scope of the following claim.

I claim:

A valve comprising a body having a chamber therein and an opening communicating therewith, a valve disk for controlling the flow of fluid through said opening, a cap secured to the body and having an opening alined with said fluid opening in the body, a valve stem comprising a rotatably adjustable member threadedly engaging said opening in the cap and a non-rotatable member holding said valve disk, said rotatable member constituting an adjusting means for moving the valve disk to close said fluid opening, a diaphragm secured between the cap and the body and engaged with said disk holding stem member to prevent leakage of fluid controlled by the valve disk about the adjusting stem member, and a coil spring surrounding said valve disk member and engaging said diaphragm and acting to unseat the valve disk when the adjusting stem member is released.

WILLIAM C. GIBSON.